(12) United States Patent
Alves

(10) Patent No.: US 10,987,858 B2
(45) Date of Patent: Apr. 27, 2021

(54) THREE DIMENSIONAL CONTINUOUS FABRICATIONS

(71) Applicant: Ford Global Technologies, LLC, Dearborn, MI (US)

(72) Inventor: Bruno Alves, Huerth (DE)

(73) Assignee: Ford Global Technologies, LLC, Dearborn, MI (US)

( * ) Notice: Subject to any disclaimer, the term of this patent is extended or adjusted under 35 U.S.C. 154(b) by 449 days.

(21) Appl. No.: 15/692,303

(22) Filed: Aug. 31, 2017

(65) Prior Publication Data
US 2018/0065295 A1 Mar. 8, 2018

(30) Foreign Application Priority Data

Sep. 5, 2016 (DE) .......................... 102016216750.2

(51) Int. Cl.
| | | |
|---|---|---|
| *B29C 64/129* | (2017.01) | |
| *B33Y 40/00* | (2020.01) | |
| *B29C 64/379* | (2017.01) | |
| *B33Y 10/00* | (2015.01) | |
| B29C 64/124 | (2017.01) | |
| B33Y 30/00 | (2015.01) | |
| B29C 67/24 | (2006.01) | |

(52) U.S. Cl.
CPC .......... *B29C 64/129* (2017.08); *B29C 64/379* (2017.08); *B33Y 40/00* (2014.12); *B29C 64/124* (2017.08); *B29C 67/24* (2013.01); *B33Y 10/00* (2014.12); *B33Y 30/00* (2014.12)

(58) Field of Classification Search
CPC ..... B29C 64/379; B29C 64/129; B29C 67/24; B29C 64/124; B33Y 10/00; B33Y 30/00; B33Y 40/00
See application file for complete search history.

(56) References Cited

U.S. PATENT DOCUMENTS

| | | | |
|---|---|---|---|
| 10,399,272 B2* | 9/2019 | Linnell | ................. B29C 64/286 |
| 2013/0056910 A1* | 3/2013 | Houbertz-Krauss | ........................ B29C 64/386 264/401 |

(Continued)

FOREIGN PATENT DOCUMENTS

| | | |
|---|---|---|
| CN | 101991467 | 3/2011 |
| CN | 103231513 | 8/2013 |

(Continued)

OTHER PUBLICATIONS

China National Intellectual Property Administration, Notification of First Office Action, dated Nov. 26, 2020.

*Primary Examiner* — Seyed Masoud Malekzadeh
(74) *Attorney, Agent, or Firm* — Burris Law, PLLC

(57) ABSTRACT

An additive production assembly and method is provided by the present disclosure. The assembly includes a tank containing radiation-curable liquid and has at least one radiation-penetrable sidewall, a projector that projects at least one beam to the sidewall, and a transportation assembly to transport an object. The beam acts through the sidewall and an area of the liquid close to the sidewall is hardened to form the object. The object is transported along a transporting direction (T) in a sideward direction away from the sidewall, as a result of which liquid flows into a gap between the object and the sidewall.

19 Claims, 2 Drawing Sheets

(56) References Cited

U.S. PATENT DOCUMENTS

Figure 1:
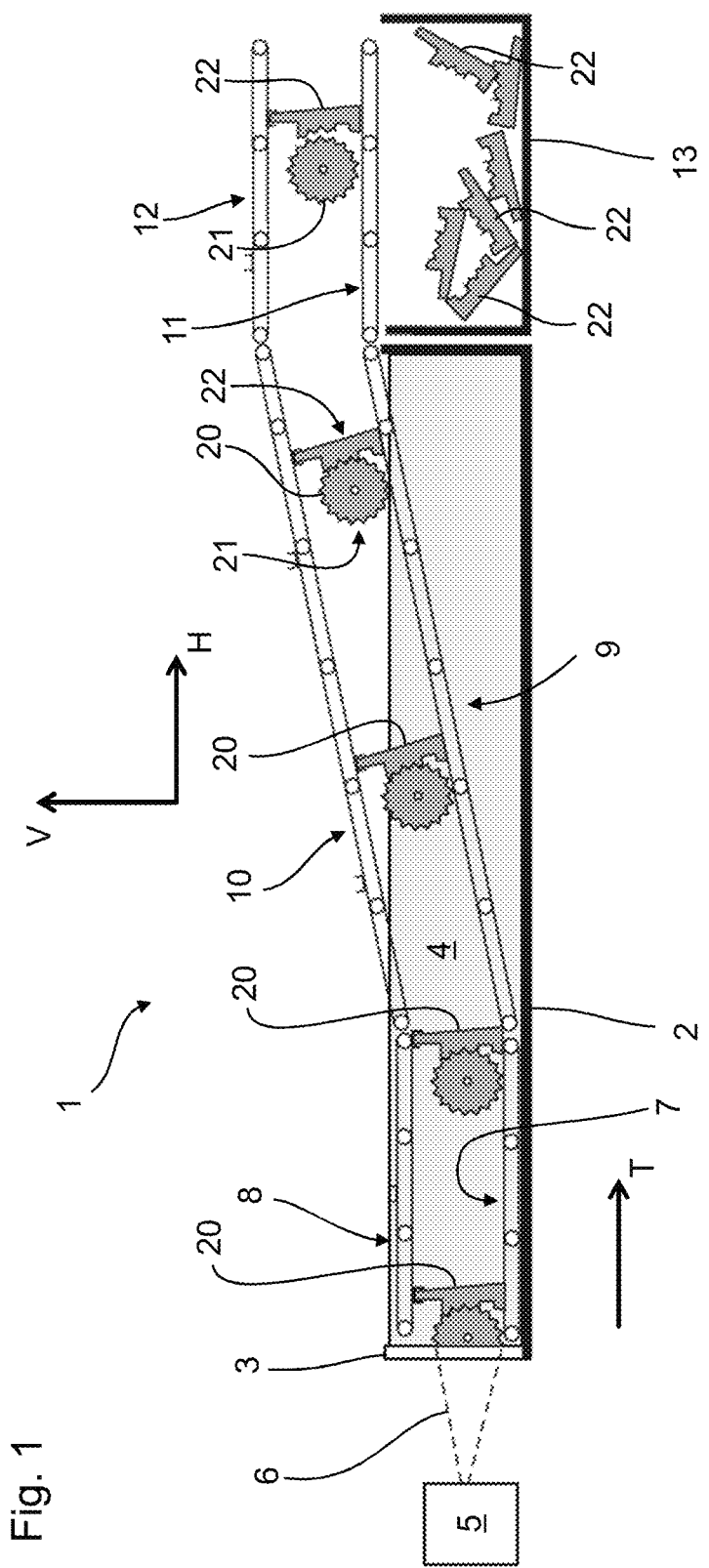

| | | | |
|---|---|---|---|
| 2015/0137426 A1* | 5/2015 | Van Esbroeck | B33Y 10/00 |
| | | | 264/401 |
| 2015/0165695 A1* | 6/2015 | Chen | B29C 64/129 |
| | | | 425/132 |
| 2015/0266235 A1 | 9/2015 | Page | |
| 2015/0290881 A1 | 10/2015 | Ederer et al. | |
| 2016/0257831 A1* | 9/2016 | Hirade | C09D 11/101 |
| 2016/0303793 A1* | 10/2016 | Ermoshkin | B29C 64/129 |
| 2017/0028618 A1* | 2/2017 | Robeson | B29C 64/129 |
| 2017/0165922 A1* | 6/2017 | Hakkaku | B29C 64/379 |
| 2017/0173880 A1* | 6/2017 | Desimone | B29C 64/171 |
| 2017/0173892 A1* | 6/2017 | Steele | B22F 10/20 |
| 2018/0355221 A1* | 12/2018 | Franke | B23K 26/082 |
| 2019/0337222 A1* | 11/2019 | Gu | C08G 18/10 |

FOREIGN PATENT DOCUMENTS

| | | |
|---|---|---|
| CN | 103802319 | 5/2014 |
| CN | 104325643 | 2/2015 |
| CN | 104626571 | 5/2015 |
| DE | 102010020158 | 11/2011 |
| DE | 102012021284 | 4/2014 |
| WO | 2014165265 | 10/2014 |

\* cited by examiner

THREE DIMENSIONAL CONTINUOUS FABRICATIONS

CROSS-REFERENCE TO RELATED APPLICATIONS

This application claims priority to and the benefit of DE 102016216750.2 filed on Sep. 5, 2016. The disclosure of the above application is incorporated herein by reference.

Field

The present disclosure relates to an additive production method.

Background

The statements in this section merely provide background information related to the present disclosure and may not constitute prior art.

In existence today are various methods by means of which, based on construction data, three-dimensional models can be produced from shapeless or shape-neutral materials such as powders or liquids. These methods are also known under the collective term "Rapid Prototyping". A preliminary forming step often takes place in this case in which the source material exists either in liquid state from the outset or is liquefied in the interim and hardened at a provided place. A known method in this case is the so-called fused deposition modeling (FDM) in which a workpiece is built up in layers from thermoplastic material. The plastic is supplied for example in powder form or strand form, melted, and in molten form applied by a print head which scans, one after the other, individual, as a rule horizontal, layers of the object to be produced.

Another method is the so-called stereolithography in which the raw material is a liquid which can be cured by means of radiation action. For example, it can be a UV-curable resin. Basically, two different method types are currently used, in which horizontally extending layers of an object can be built up in succession in each case. In one method variant, hardening radiation is directed onto the surface of the liquid which is located in a tank. In this case, a platform which can travel vertically inside the tank is first of all positioned directly beneath the surface. Next, a layer is hardened directly on the platform and the platform travels downward by a layer thickness. Liquid now flows toward the object or is drawn over the object by a wiper and covers the hardened layer so that a further layer can be hardened. By hardening in layers and traveling of the platform, the object is assembled from a sequence of horizontally extending layers. In another variant, the hardening radiation acts from below through a radiation-penetrable bottom of the tank so that in each case a layer can be hardened directly on the bottom. The object to be produced adheres to the underside of a vertically movable platform which after the hardening of each layer is moved upward by a layer thickness. Since the layer which is produced in each case also adheres to the bottom of the tank, however, it has to be detached by means of a shaking movement or the like, which constitutes an undesirable mechanical loading of the component.

Currently available stereolithography methods are not suitable for the continuous or virtually continuous serial production of components. The removal of the finished component form the top side or bottom side of the platform is relatively time consuming and means an interruption of the production process.

U.S. Application No. 2015/0290881 A1 shows a device for producing three-dimensional models, in which a print head can move two-dimensionally within an oblique plane. By means of the print head, a powdered material, with which the device is loaded, can be locally melted, as a result of which a model can be built up by layers piece by piece within the mentioned plane. By means of a conveyor belt, the model is moved on horizontally during the build-up process.

CN 103231513 A discloses a 3D-printer in which a print head can be moved three-dimensionally over a stationary platform on which an object is to be produced. The print head is connected via a feed line to a supply tank for a UV-curable resin which can be discharged via a nozzle of the print head. The print head also has a UV-light source by means of which the discharged resin is hardened.

CN 104325643 A discloses a production method in which a liquid, UV-curable resin is held inside a tank. By means of a UV-radiation source mounted on a three-dimensionally movable arm, an uppermost layer of the resin can be hardened. Arranged at the side of the tank is an injection device which can introduce a liquid into the tank, the density of the liquid being greater than that of the liquid resin so that the latter floats on the liquid. In the course of the production process, horizontally extending layers of an object to be produced are hardened piece by piece while the surface of the liquid resin is raised in succession by addition of liquid.

Described in CN 104626571 A is a 3D-printer in which a vertically movable platform, on which an object can be produced, is arranged on a base part. A thermoplastic material, which is fed in strand form, is liquefied in a print head which is part of a horizontally movable unit which can be positioned over the platform.

WO 2014/165265 A1 discloses a lithography process in which an object to be produced is built up from the top downward. In this case, the layer build up is not carried out in one plane, however, but in spiral form by one or more delivery units for a radiation-curable resin rotating relative to a build-up platform on which the object to be produced is retained. In the course of the production process, the build-up platform moves vertically upward at the same time with the mentioned rotation.

U.S. Application No. 2015/0266235 A1 discloses an additive production method which is based on fused deposition. By means of a nozzle, strands of a thermoplastic material are applied piece by piece. In order to achieve a better cohesion of different strands on the one hand and to be able to reproduce any surface shapes more precisely on the other hand, it is provided that the application of the strands is not carried out exclusively in parallel, horizontal planes but within optionally inclined or even curved areas.

SUMMARY

The present disclosure provides an efficient additive production method which operates quickly and continuously so that it is also suitable for a serial production.

The present disclosure provides an additive production method having the features of claim 1, wherein the dependent claims relate to advantageous forms of the present disclosure.

According to the present disclosure, an additive production method is provided. The method can be associated with the field of rapid prototyping. As will be made clear, however, it is not only suitable for the production of prototypes or individual models, but possibly also for serial production.

Used in the method is a tank which contains a radiation-curable liquid and has at least one radiation-penetrable sidewall. "Radiation-curable" means here that the liquid, by means of the action of at least one specified type of radiation, changes into a solid state, for example by means of polymerization. It can especially be a liquid which is curable by UV-radiation (or UV-curable, for short), e.g. a resin, which exists as a liquid in the form of monomers or oligomers and polymerizes under UV-radiation.

The tank can also be referred to as a container or basin and can be differently shaped and dimensioned depending on requirements of the method. The tank can be open or closed at the top. At least one sidewall of the tank is radiation-penetrable, which naturally relates to that radiation by means of which the liquid can be hardened. It is understood that a certain amount of the radiation is reflected and/or absorbed, which is why the penetrability is normally not one hundred percent. Typically, at least 50% or at least 80% of the radiation is allowed to pass through, wherein smaller proportions would also be conceivable, as a result of which the method becomes uneconomical, however. In the case of UV-radiation, the sidewall can be glass, for example, which may not reveal appreciable UV-absorption. The sidewall forms in this case a part of the tank which is arranged at the side with regard to the reference system which is predetermined by the gravity force. The sidewall is therefore part of neither the bottom nor a cover of the tank. In other words, the sidewall extends upward or downward but, however, not necessarily vertically. The sidewall in this case does not have to be radiation-penetrable as a whole but a radiation-penetrable window can be formed for example within a vertical wall.

In the case of the method according to the present disclosure, radiation acts through the sidewall, as a result of which liquid close to the sidewall is hardened at least in certain areas. A suitable radiation source is therefore arranged outside the tank and generates the corresponding radiation which penetrates the sidewall and acts upon the liquid in the tank. To be more precise, a certain amount of the liquid is hardened close to the sidewall (that is to say on its inner side) as a result of the effective radiation. As used herein, the term "cure" as well as "harden" is to be construed in broad terms and does not mean that for example a polymerization or another process based on curing has to be totally excluded. In the sense of a targeted production method, the radiation acts in this case normally corresponding to a specified pattern. It could also be said that a predetermined area is radiated. In this case, it is possible that for example a scanning of the area by means of a narrowly focused beam is carried out or that a specified radiation pattern is projected at once. It is understood that the radiation source and therefore the spatial or time-based radiation pattern can be controlled in conformance with predetermined data of an object to be produced. The radiated area corresponds in this case to a (possibly uneven) cross section of the object.

Furthermore, during the process an object which is formed by hardening is transported sideward along a transporting direction away from the sidewall, as a result of which liquid flows into a gap between the object and the sidewall. As a result of the hardening described above, a flat (or possibly linear or punctiform) region of hardened material, which is associated with an object to be produced, is created. As a result of the mentioned transporting movement, the object, including this hardened region, is removed from the sidewall, or it could also be said the hardened material is separated from the sidewall. Created as a result of this is a gap into which non-hardened liquid flows. This flow movement is based partially on the gravity force, partially on a negative pressure which is created during the separation between the object and the sidewall. The inflowing liquid can in turn be hardened by radiation, as a result of which a successive buildup of the object is carried out. The transporting of the object is carried out along the transporting direction which can be variably selected within the framework of the method, wherein, however, it includes a movement in the sideward direction (that is to say transversely to the direction of the gravity force). This does not exclude the transporting direction also having a vertical component (upward or downward). The transporting can be carried out by means of at least one transporting device or conveying device which is arranged at least partially inside the tank.

Overall, it can be said that in the production method according to the present disclosure, no buildup of horizontal layers is carried out from the top downward or from the bottom upward, but the buildup of the object is carried laterally. As a result of the fact that the object is transported away in a sideward direction, the actual production region close to the sidewall is directly freed again and the production of a new object can be started. As a result of the at least partially sideward movement, the object remains completely or at least partially inside the liquid during its entire production, wherein its buoyancy force leads to the object being able to be more easily stabilized. Compared with a build up from the bottom upward, in which a platform is lowered successively while hardening on the surface of the liquid is carried out in layers, it is a clear advantage that postflowing of liquid into the region of the sidewall is carried out comparatively quickly and without further assistance.

The object is transported in a continuous manner while the radiation is in effect. That is to say, unlike known stereolithography methods in which a layer of the object is built up while this is at rest and a lowering or raising is then carried out while the radiation source is switched off, in the case of this form, the hardening by means of radiation and the transporting of the object are carried out in parallel with each other in respect to time. The object can be transported in this case by means of at least one continuous conveyor which can be operated at constant speed. On the one hand, the building of the object can possibly be carried out considerably quicker than in the case of a discontinuous, horizontal build up in layers, on the other hand for control engineering reasons, only a sufficiently uniform movement of the object and a time-based coordination of the radiation pattern has to be catered for. However, the need to coordinate a stopping of the object spatially and in respect to time with the creation of the respective radiation pattern is dispensed with. A positive aspect in the case of this method variant is also that as a rule absolutely no discontinuous transitions can be discerned between individual layers in the finished object, but rather a smooth outer contour is produced.

It is particularly, but not exclusively, advantageous in the case of the aforesaid continuous form of the method if by means of a structure of the sidewall stopping of the object is inhibited. That is to say, the sidewall is altogether structured, or for example structured just on the inner side, in such a way that the object cannot adhere in the course of hardening. For example, the sidewall can be of oxygen-permeable design, as a result of which the polymerization is inhibited in the case of specified UV-curable resins. In this case, hardening may not occur in a small region directly adjoining the sidewall, whereby adhesion is inhibited. Regardless of how the adhesion is inhibited, the continuous flow of the method is naturally supported as a result of this. It is then unnecessary to release the object from the sidewall by means of greater force expenditure or even a shaking movement. Therefore, no mechanical loading, which could deform or otherwise damage the object, occurs either.

As already indicated above, in addition to a horizontal component the transporting direction also has a vertical component, i.e. the object can also be raised or lowered as a result of the transporting. In one form, the transporting is carried out at least predominantly horizontally. Therefore, the transporting direction advantageously occupies an angle of at most 30° to the horizontal. The horizontal, or horizontal line, is in this case the plane which extends perpendicularly to the direction of action of the gravity force. The mentioned angle can especially be at most 20° or at most 10°. The transporting direction can especially lie in the horizontal. Such an at least predominantly horizontal transporting has various advantages. On the one hand, it is also possible, using a simply designed transporting device, e.g. a type of conveyor belt, to transport the object without costly support since it can simply stand on an (approximately) horizontal surface of the transporting device. Normally, as a result of the gravity force there is no occurrence of appreciable tipping moments or forces which can lead to a displacement of the object on the transporting device. Also, it is to be taken into consideration that the distance of an uppermost point of the object from the surface of the liquid in the tank does not alter, or alters only slightly. That is to say that the object in the course of production and also possibly even when being transported onward to the completion point remains totally or predominantly inside the liquid and is therefore further stabilized as a result of the buoyancy force. In certain circumstances, the density of the hardened material can be slightly greater than that of the liquid, but the weight force of the object is at least partially or largely compensated by the buoyancy. This also contributes to the stabilization, as a result of which costly support devices can generally be dispensed with.

As already commented upon above, the sidewall can be in various shapes, for example curved or angled. In these cases, the generated radiation pattern, corresponding to a coordinate transformation, naturally is adapted to the shape of the sidewall since in this case the respectively hardened region of the liquid does not correspond to a flat cross-sectional area of the object (but to a curved, angled, or the like, cross-sectional area). Overall, however, in one form the sidewall is of flat design. This statement naturally refers to the part of the sidewall which can be covered to the maximum by the radiation. If there are radiation-penetrable regions which cannot be covered by the radiation, these themselves can understandably be of non-flat design.

In this case, it is also advantageous if the sidewall extends perpendicularly to the transporting direction. The extension direction of the sidewall corresponds in the method to the extension direction of the build-up plane of the object, that is to say the plane in which the hardening takes place. In this variant, the transporting direction therefore extends at a 90° angle to the build-up plane. This inter alia is advantageous with regard to the coordinate system taken as a basis which in this case can be cartesianally selected, wherein the transporting direction corresponds to a first axis (e.g. X-axis) and the build-up plane, into which the respective radiation pattern is projected, is spanned by the second and third axes (e.g. Y-axis and Z-axis).

It is also advantageous if the sidewall extends at least approximately perpendicularly. The sidewall can therefore occupy an angle of at most 30° to the vertical, wherein the vertical or vertical line is in turn defined by the direction of action of the gravity force. Furthermore, the angle can be at most 20° or at most 10°. In particular, the sidewall can extend perpendicularly. Since the sidewall, as already mentioned, specifies the build-up plane, it can be provided as a result of a vertical extension of the sidewall that regions of the object lying one above the other can be built up in each case, which generally makes it unlikely that the object becomes unbalanced.

The possibilities of the method according to the present disclosure go beyond the conventional production of individual prototypes or models. In actual fact, a proper serial production is possible, which in the case of conventional stereolithography methods is already inhibited by the fact that the finished object is produced in each case on or under a platform and first of all has to be removed from this before a further object can be produced. This issue does not occur in the case of the method according to the present disclosure since the finished object is transported away in a sideward direction and therefore frees the actual production area adjoining the sidewall. In particular, for example when the transporting is carried out by a type of conveyor belt, a base is immediately made available for the production of the next object. Therefore, while the object is being transported inside the tank, the production of a next object can begin. In the extreme case, a reduced gap (e.g. 1 mm or even less) could be allowed between two consecutively produced objects. The further transporting of the initially produced object is therefore carried out in this case in parallel in respect to time with the production of the following object. Therefore, a true serial production is possible.

Naturally, it is especially advantageous in the case of this method variant, but also in general, if the liquid in the tank is filled continuously or at intervals from a reservoir since the production of the object(s) consumes liquid. Filling is desired at the latest when the liquid level lies below an upper edge of the radiation-penetrable sidewall.

At the end of production, the object is removed in some way from the tank. While the object is being continuously transported in the course of production, the removal can also be carried out by means of a discontinuous transportation, e.g. using a gripper arm which grabs the object and lifts it from a continuous conveyor. However, the finished object is advantageously transported out of the tank in a continuous manner. This in turn can be carried out by means of a continuous conveyor, e.g. a conveyor belt. In this case, it is possible that the object is transported by a first continuous conveyor during production and is then transferred to a second continuous conveyor which transports the object out of the tank. In particular, the object can be transported upward at an angle for this, e.g. by means of an inclined conveyor belt or the like. In those cases in which the transporting direction does not extend horizontally, it is also possible, however, that the object is transported out of the tank along the transporting direction during the further process. For example, a single conveyor belt, which is upwardly inclined, could transport the object during production and conduct it out of the tank during the further process.

As already discussed, at least in the case of some variants of the method according to the present disclosure a support of the object can be dispensed with or this can be reduced. In certain cases, especially depending on the three-dimensional shape of the finished object, a support of the object is expedient, however. According to one alternative, support devices could be arranged on the transporting device and could be re-utilized for a plurality of objects during a serial production. According to another form, support structures can be created on the object at the same time with this and removed after the object has been transported out of the tank. In other words, during production specified sub-structures are created, which sub-structures are not counted among the desired final shape of the object but only serve for stabilizing the object during production and the further transporting, e.g. to inhibit a tipping over of the object. Such support structures can have the form of holders, suspensions, props, stilts or the like. Since these support structures are not part of the actually desired shape of the object, they are removed after the object has vacated the tank. The detaching of the support structures can in certain circumstances be carried out mechanically by breaking up or cutting up or by means of another suitable method such as water-jet cutting or laser cutting.

Further areas of applicability will become apparent from the description provided herein. It should be understood that the description and specific examples are intended for purposes of illustration only and are not intended to limit the scope of the present disclosure.

DRAWINGS

Figure 2:
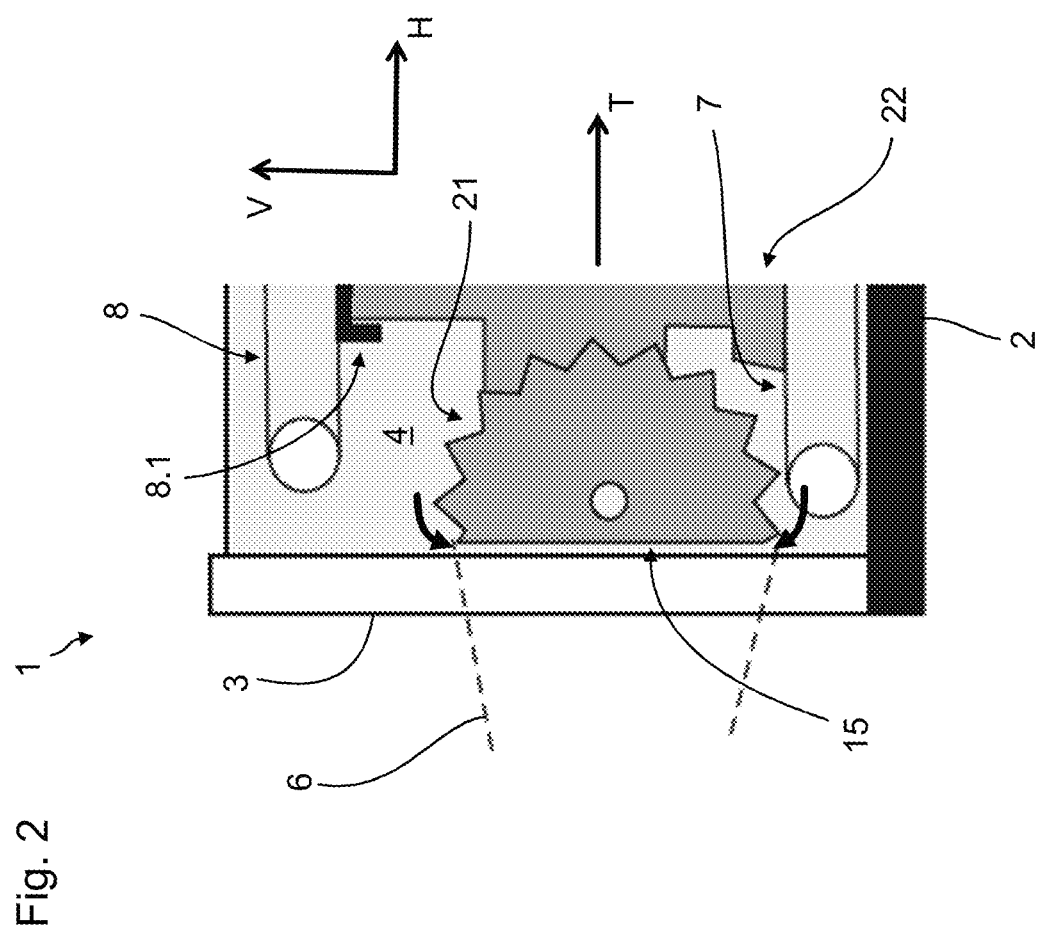

In order that the disclosure may be well understood, there will now be described various forms thereof, given by way of example, reference being made to the accompanying drawings, in which:

FIG. 1 shows a schematic view of a device for implementing the method according to the present disclosure; and FIG. 2 shows a detailed view of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows in schematic form a production plant 1 by means of which an additive manufacturing method according to the present disclosure can be implemented. The production plant 1 comprises an elongated tank 2 which contains a UV-curable liquid 4, e.g. a resin. The liquid 4, in one form, comprises monomers, polymerizes under the effect of UV-radiation and becomes solid as a result. The tank 2 in the present example is of parallelepipedal design with an open upper side and by its edges is oriented along the vertical V and the horizontal H. In particular, a sidewall 3 of the tank 2 extends perpendicularly, that is to say in the direction of the vertical V. This sidewall 3 is of UV-penetrable design. Arranged at the side of the tank 2 is a UV-projector 5 which can project UV-beams 6 onto the sidewall 3 and through this into the liquid 4 behind. The UV-projector 5 is in this case connected to a control unit, not shown, which controls the pattern of the UV-beams 6, that is to say their spatial and/or time-based intensity distribution.

The production plant features a row of continuous conveyors 7-12. A first pair of continuous conveyors 7, 8 is arranged in this case totally inside the tank 2 and in the liquid 4. These continuous conveyors 7, 8 are designed for transporting an object 20 along a horizontal transporting direction T. In this case, the object 20 can stand on a first continuous conveyor 7, which for example can be designed as a conveyor belt, while a second continuous conveyor 8, which runs parallel thereto, guides an upper part of the object 20. A second pair of continuous conveyors 9, 10 is connected thereto and leads out of the tank 2 obliquely upward at an angle of approximately 25°. Connected at the side above the tank 2 is a third pair of continuous conveyors 11, 12 which in turn extend horizontally.

During the operation of the production plant 1, the continuous conveyors 7-12 run at a constant speed. In the region of the UV-penetrable sidewall 3, the UV beams 6 bring about a hardening of the liquid 4, as a result of which the object 20 is formed piece by piece. In the present example, the object is a toothed wheel 21 which is connected in a materially bonded manner to a support structure 22. The support structure 22 in this case serves to inhibit a tipping over of the object 20. At its upper end, the support structure 22 engages with a holding device 8.1 of the second continuous conveyor 8. Whereas by means of the first pair of continuous conveyors 7, 8 a transporting movement along the transporting direction T is maintained, as a result of the pattern of the UV beams 6 regions of the liquid 4 close to the sidewall 3 are hardened, wherein the pattern is altered so that in each case it corresponds to a cross section of the object 20 to be created. In the process, the time-based change of the pattern is coordinated with the transporting speed so that the respective cross sections are joined in sequence along the transporting direction T without distortion.

The sidewall 3 in this case is designed so that adhesion of the object 20 to it is inhibited. For example, it can be an oxygen-permeable membrane. As a result, the object 20 can be removed from the sidewall 3 without specific force expenditure, whereby a gap 15 is created, as can be seen in the detailed view of FIG. 2. Reference is to be made to the fact that the size of the gap 15 is not shown to scale in FIG. 2. On the one hand due to gravitation, on the other hand due to a developing negative pressure which follows, liquid 4 flows into the gap 15, as indicated by the thick arrows. In other words, without further measures the gap 15 fills again with liquid which can be hardened during the further process by means of the UV beams 6. The method works continuously in this case, i.e. it is not necessary to stop the object 20 in the interim in order to add a discrete layer. In the course of the additive production, the support structures 22, which serve for positional securing of the object 20, are also created. In general, these, however, can be constructed rather economically since in the case of the depicted method the object 20 during its build up is surrounded by the liquid 4 which has a similar density. The difference of weight force and buoyancy force of the object 20 is therefore small. After completion of the object 20, the UV projector is switched off for a certain time, while the continuous conveyors 7 to 12 continue to run.

As shown in FIG. 1, the production of a new object 20 begins while the last produced object 20 is still located inside the tank 2 on the first continuous conveyor 7. Since each object 20 is transported away in the sideward direction, the actual production area close to the sidewall 3 is immediately free again and can be re-utilized. After vacating the first two continuous conveyors 7, 8, the respective object 20 is transferred onto the second pair of continuous conveyors 9, 10, as a result of which it is transported out of the tank 2 and out of the liquid 4. During this, surplus liquid 4 for the most part can run off the object 20 back into the tank 2.

Naturally, the production of each object 20 deprives the tank 2 of a certain amount of liquid 4 which is replaced either continuously or at intervals. For reasons of clarity, a corresponding feed line is not shown here.

Above the tank 2, the object 20 is transferred to the third pair of continuous conveyors 11, 12 where by means of tools, not shown here, for example by laser cutting or water-jet cutting, the toothed wheel 21 can then be separated from the support structure 22. The support structures 22 which are no longer required can be collected in a container 13.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An additive production method with a tank, having a radiation-curable liquid and at least one radiation-penetrable sidewall, the additive production method comprising:
   sending a beam through the sidewall of the tank containing UV-curable liquid and hardening the UV-curable liquid in the tank that is adjacent the sidewall and forming an object, wherein the sidewall extends perpendicular to a horizontal direction, and
   transporting the object being formed by hardening of the UV-curable liquid along a transporting direction in a sideward direction away from the sidewall using a row of continuous conveyors comprising parallel pairs of continuous conveyors, wherein the object is transported between the parallel pairs of continuous conveyors, and wherein the UV-curable liquid flows into a gap created between the object and the sidewall as successive buildup of the object is carried out and a hardened region of the object is formed and is separated from and transported away from the sidewall.

2. The production method as claimed in claim 1, wherein the object is transported continuously while sending the beam through the sidewall.

3. The production method as claimed in claim 1, wherein the sidewall inhibits adhesion of the object through a structure.

4. The production method as claimed in claim 1, wherein an area of the transporting direction occupies a horizontal (H) angle of at most 30°.

5. The production method as claimed in claim 1, wherein the sidewall is flat.

6. The production method as claimed in claim 5, wherein the sidewall extends perpendicularly to the transporting direction.

7. The production method as claimed in claim 1, wherein while the object is being transported inside the tank, production of a next object begins.

8. The production method as claimed in claim 1, wherein a finished object is transported continuously out of the tank.

9. The production method as claimed in claim 1, wherein support structures are created on the object and are removed after the object has been transported out of the tank.

10. The production method as claimed in claim 1, wherein the transporting direction is at most 30° to the horizontal direction.

11. The production method as claimed in claim 1, wherein the transporting direction is the horizontal direction.

12. The production method as claimed in claim 1, wherein the row of continuous conveyors is a row of conveyor belts.

13. The production method as claimed in claim 1, wherein a first pair of the row of continuous conveyors is disposed totally inside the tank containing UV-curable liquid.

14. The production method as claimed in claim 13, wherein a second pair of the row of continuous conveyors leads out of the tank containing UV-curable liquid.

15. The production method as claimed in claim 14, wherein a third pair of the row of continuous conveyors is disposed outside the tank containing UV-curable liquid.

16. An additive production method with a tank, having a radiation-curable liquid and at least one radiation-penetrable sidewall, the additive production method comprising:
   sending a beam through the sidewall of the tank containing UV-curable liquid and hardening the UV-curable liquid in the tank that is adjacent the sidewall and forming an object, wherein the sidewall extends perpendicular to a horizontal direction, and
   transporting the object being formed by hardening of the UV-curable liquid along a transporting direction in a sideward direction away from the sidewall using a row of conveyor belts comprising pairs of continuous belts, wherein the object is transported between the pairs of continuous belts, and wherein the UV-curable liquid flows into a gap created between the object and the sidewall as successive buildup of the object is carried out and a hardened region of the object is formed and is separated from and transported away from the sidewall.

17. The production method as claimed in claim 16, wherein the transporting direction is the horizontal direction.

18. The production method as claimed in claim 16, wherein a first pair of the row of conveyor belts is disposed totally inside the tank containing UV-curable liquid and a second pair of the row of conveyor belts leads outside the tank containing UV-curable liquid.

19. The production method as claimed in claim 18, wherein a third pair of the row of conveyor belts is disposed totally outside the tank containing UV-curable liquid.

* * * * *